United States Patent
Xiao et al.

(10) Patent No.: US 12,011,010 B2
(45) Date of Patent: Jun. 18, 2024

(54) METHOD FOR MODERATELY INCREASING CONTENT OF DIMETHYL DISULFIDE IN CASEIN-CONTAINING PROCESSED CHEESE

(71) Applicant: ZHEJIANG UNIVERSITY OF SCIENCE AND TECHNOLOGY, Zhejiang (CN)

(72) Inventors: Gongnian Xiao, Zhejiang (CN); Kewei Cheng, Zhejiang (CN); Ruosi Fang, Zhejiang (CN); Lin Li, Zhejiang (CN); Bingquan Chu, Zhejiang (CN); Xin Lu, Zhejiang (CN); Jinyan Gong, Zhejiang (CN); Xian Li, Zhejiang (CN)

(73) Assignee: ZHEJIANG UNIVERSITY OF SCIENCE AND TECHNOLOGY, Zhejiang (CN)

( * ) Notice: Subject to any disclaimer, the term of this patent is extended or adjusted under 35 U.S.C. 154(b) by 3 days.

(21) Appl. No.: 17/903,975

(22) Filed: Sep. 6, 2022

(65) Prior Publication Data
US 2024/0074448 A1    Mar. 7, 2024

(51) Int. Cl.
  *A23C 19/084*  (2006.01)
  *A23C 19/06*   (2006.01)
  *A23C 19/097*  (2006.01)

(52) U.S. Cl.
  CPC .......... *A23C 19/084* (2013.01); *A23C 19/063* (2013.01); *A23C 19/0973* (2013.01)

(58) Field of Classification Search
  CPC ..... A23C 19/08; A23C 19/081; A23C 19/082; A23C 19/084; A23C 19/086; A23C 19/063
  See application file for complete search history.

(56) References Cited

U.S. PATENT DOCUMENTS

| | | | |
|---|---|---|---|
| 4,800,097 A * | 1/1989 | Morris | A23L 21/25 426/632 |
| 4,853,232 A * | 8/1989 | Subramaniam | C12Y 304/23004 426/35 |
| 2014/0037819 A1* | 2/2014 | Dinesen | A23C 19/084 426/531 |
| 2022/0071223 A1* | 3/2022 | Stout | A23P 30/36 |

FOREIGN PATENT DOCUMENTS

| | | | |
|---|---|---|---|
| CN | 112021412 A | * 12/2020 | ........... A23C 19/072 |
| CN | 114097891 | 3/2022 | |

OTHER PUBLICATIONS

Hannon, "Production of ingredient-type Cheddar cheese with accelerated flavor development by addition of enzyme-modified cheese powder", J. Dairy Sci. 2006, 89, pp. 3749-3762 (Year: 2006).*

* cited by examiner

*Primary Examiner* — Changqing Li
(74) *Attorney, Agent, or Firm* — JCIPRNET

(57) ABSTRACT

The present invention relates to a method for moderately increasing the content of dimethyl disulfide in casein-containing processed cheese. The method includes the following steps: taking a cheese powder, adding chymosin for enzymolysis, and subjecting a material obtained after the enzymolysis to puffing and drying to obtain a modified cheese powder; preparing materials; taking the modified cheese powder, heating the modified cheese powder under stirring until the cheese powder is melt, adding sodium bicarbonate to adjust the pH to 6-7, and adding papain for enzymolysis; taking a material obtained after the enzymolysis, adding butter, a skimmed milk powder, fructo-oligosaccharide and water for mixing by stirring, and then adding an emulsifying salt, glutamine transaminase and salt for uniform heating and stirring to obtain a mixture; and subjecting the mixture to heat treatment, hot filling and cooling in sequence to obtain processed cheese.

3 Claims, No Drawings

METHOD FOR MODERATELY INCREASING CONTENT OF DIMETHYL DISULFIDE IN CASEIN-CONTAINING PROCESSED CHEESE

FIELD OF TECHNOLOGY

The present invention belongs to the technical field of processing of dairy products, and specifically relates to a method for moderately increasing the content of dimethyl disulfide in casein-containing processed cheese.

BACKGROUND

As a fresh or completely fermented dairy product, cheese is prepared by using many processes such as sterilization, addition of starters and enzymes, curdling and discharge of whey with fresh milk as a raw material. The cheese has a very high nutritional value, and includes 21%-32% of proteins, 22%-31% of fat, 0.1%-1.0% of lactose, 700-900 mg/kg of calcium, 0.6%-0.7% of iron and abundant vitamins. A person will not have lactose intolerance after eating the cheese. In addition, since the cheese is fermented, protein allergies can be avoided. The cheese has not only abundant proteins, but also extremely high protein digestibility and biological value. Accordingly, the cheese is known as "milk gold" in the industry.

The flavor of the cheese is closely related to the content of dimethyl disulfide in the cheese. The existing cheese has a low content of the dimethyl disulfide, so that the cheese has a poor flavor, and is not suitable for some people, especially Chinese. When the content of the dimethyl disulfide is moderately increased, the flavor of the cheese can be significantly changed to be suitable for tastes of many people.

According to a Chinese invention patent (with a publication number of CN114097891 A), a method for increasing the content of methylthiopropanal in processed cheese is disclosed. According to the method, cheese imported from countries other than China is used as a raw material, which has formed a unique cheese flavor. Then, the cheese is processed. The content of the methylthiopropanal in the processed cheese is moderately increased by adding papain and controlling the enzymolysis time, and the quality and flavor of the processed cheese are changed. The method has the disadvantage that the cheese with the existing flavor is modified. However, in the present invention, the cheese is modified first, and then the content of dimethyl disulfide in the cheese is moderately increased by using a specific processing method, so that the flavor of the cheese is improved, and a new idea and approach are provided for improving the flavor of the cheese.

SUMMARY

In view of the problems in the prior art, an objective of the present invention is to design and provide a technical solution of a method for appropriately increasing the content of dimethyl disulfide in casein-containing processed cheese.

The present invention specifically adopts the following technical solutions.

The method for moderately increasing the content of dimethyl disulfide in casein-containing processed cheese is characterized by comprising the following steps:

1) taking a cheese powder, adding chymosin for enzymolysis, and subjecting a material obtained after the enzymolysis to puffing and drying to obtain a modified cheese powder;

2) preparing the following materials by weight: 25-35 kg of the modified cheese powder, 15-25 kg of butter, 3-7 kg of a skimmed milk powder, 0.3-0.7 kg of sodium bicarbonate, 0.8-1.2 kg of fructo-oligosaccharide, 0.8-1.2 kg of an emulsifying salt, 0.003-0.007 kg of glutamine transaminase, 0.2-0.6 kg of salt, 0.03-0.07 kg of papain, and 38-44 kg of water;

3) taking a formula amount of the modified cheese powder, heating the modified cheese powder under stirring until the cheese powder is melt, adding a formula amount of the sodium bicarbonate to adjust the pH to 6-7, and adding a formula amount of the papain for enzymolysis;

4) taking a material obtained after the enzymolysis in step 3), adding formula amounts of the butter, the skimmed milk powder, the fructo-oligosaccharide and water for mixing by stirring, and then adding formula amounts of the emulsifying salt, the glutamine transaminase and the salt for uniform heating and stirring to obtain a mixture; and 5) subjecting the mixture obtained in step 4) to heat treatment, hot filling and cooling in sequence to obtain processed cheese.

According to the method for moderately increasing the content of dimethyl disulfide in casein-containing processed cheese, wherein in step 1), the enzymolysis is conducted under the following conditions: the chymosin has an activity of 120,000-150,000 U/g and an addition amount of 1.5-3.5 ml/kg, a moisture proportion is controlled to 10-15%, and the temperature is raised to 40° C. for heat preservation for 10-20 min.

According to the method for moderately increasing the content of dimethyl disulfide in casein-containing processed cheese, wherein in step 1), the puffing and the drying are conducted under the following conditions: the puffing is conducted by using a puffing machine at a temperature of 160-200° C., and after the puffing, the drying is conducted by extrusion at a temperature of 75° C. until a product has a moisture content of less than 12%.

According to the method for moderately increasing the content of dimethyl disulfide in casein-containing processed cheese, wherein in step 3), the enzymolysis is conducted for 5-15 min.

According to the method for moderately increasing the content of dimethyl disulfide in casein-containing processed cheese, wherein in step 5), the heat treatment is conducted at a temperature of 90° C. for 15 min; the hot filling is conducted at 85° C.; and the cooling is conducted by rapid cooling to 30° C.

The puffing machine involved in the present invention is an existing apparatus. For example, a twin-screw puffing machine with a model of SLG produced and sold by Jinan Saibainuo Technology Development Co., Ltd. may be used.

The present invention has the following advantageous effects.

1) According to the present invention, the cheese powder is used as a raw material and subjected to the enzymolysis with the chymosin and the puffing, so that the cheese powder is modified to produce casein. The quality and flavor of the processed cheese are moderately improved, and the processed cheese is suitable for tastes of many people, especially Chinese.

2) According to the present invention, the raw material is emulsified, treated with the papain, melt, and then subjected to the enzymolysis under the heat preservation, so that the content of a main characteristic flavor substance in the processed cheese is moderately increased.

3) The mixture is modified by using glutaminase, so that the viscoelasticity of the Anjia cheese is improved, a certain pressure difference is generated in the mixture, the protein conformation is changed, and a more stable gel structure is formed after the modification.

4) The preparation method of the present invention is simple and easy to operate, and has high production efficiency. The processed cheese product obtained by using a specific preparation process and process parameters is fine and stable in texture.

DESCRIPTION OF THE EMBODIMENTS

The present invention is described in detail below in conjunction with examples.

Example 1

1) A cheese powder is taken, and chymosin is added for enzymolysis. The enzymolysis is conducted under the following conditions: the chymosin has an activity of 120,000-150,000 U/g and an addition amount of 2.5 ml/kg, an appropriate amount of water is added to control a moisture proportion to 15%, and the temperature is raised to 40° C. for heat preservation for 15 min. Then, a material obtained after the enzymolysis is subjected to puffing and drying. The puffing and the drying are conducted under the following conditions: the puffing is conducted by using a puffing machine at a feeding rate of 12 Hz, powder-water mixing is conducted in a first stage, clinker kneading is conducted in a second stage, puffing at a high temperature of 160-200° C. is conducted in a third stage, and then the drying is conducted by extrusion at a temperature of 75° C. until a product has a moisture content of less than 12% to obtain a modified cheese powder.

2) The following materials are prepared by weight: 30 kg of the modified cheese powder, 20 kg of butter, 5 kg of a skimmed milk powder, 0.5 kg of sodium bicarbonate, 1 kg of fructo-oligosaccharide, 1 kg of an emulsifying salt (including sodium hexametaphosphate and trisodium phosphate at a mass ratio of 1:1), 0.005 kg of glutamine transaminase, 0.4 kg of salt, 0.05 kg of papain, and 41.6 kg of water.

3) A formula amount of the modified cheese powder is taken and heated to 50° C. under stirring at a rotation speed of 300 rpm until the cheese powder is melt, a formula amount of the sodium bicarbonate is added to adjust the pH to 6, and a formula amount of the papain is added and subjected to heating and stirring at 300 rpm and standing for enzymolysis for 10 min.

4) A material obtained after the enzymolysis in step 3) is taken, formula amounts of the butter, the skimmed milk powder, the fructo-oligosaccharide and water are added for mixing by stirring, and then formula amounts of the emulsifying salt, the glutamine transaminase and the salt are added for heating and stirring at 40 rpm for 3 min to obtain a mixture.

5) The mixture obtained in step 4) is subjected to heat treatment, hot filling and cooling in sequence to obtain processed cheese. The heat treatment is conducted at a temperature of 90° C. for 15 min; the hot filling is conducted at 85° C.; and the cooling is conducted by rapid cooling to 30° C.

Example 2

On the basis of Example 1, other conditions are the same as those in Example 1, except that the following materials are prepared by weight: 25 kg of a cheese powder, 15 kg of butter, 3 kg of a skimmed milk powder, 0.3 kg of sodium bicarbonate, 0.8 kg of fructo-oligosaccharide, 0.8 kg of an emulsifying salt (including sodium hexametaphosphate and trisodium phosphate at a mass ratio of 1:1), 0.003 kg of glutamine transaminase, 0.2 kg of salt, 0.03 kg of papain, and 38 kg of water.

Example 3

On the basis of Example 1, other conditions are the same as those in Example 1, except that the following materials are prepared by weight: 35 kg of a cheese powder, 25 kg of butter, 7 kg of a skimmed milk powder, 0.7 kg of sodium bicarbonate, 1.2 kg of fructo-oligosaccharide, 1.2 kg of an emulsifying salt, 0.007 kg of glutamine transaminase, 0.6 kg of salt, 0.07 kg of papain, and 44 kg of water.

Comparative Example 1

On the basis of Example 1, in step 1), a cheese powder is only subjected to enzymolysis and drying, but not puffing, and other conditions are the same as those in Example 1. That is to say, a cheese powder is taken, and chymosin is added for enzymolysis. The enzymolysis is conducted under the following conditions: the chymosin has an activity of 120,000-150,000 U/g and an addition amount of 2.5 ml/kg, an appropriate amount of water is added to control a moisture proportion to 15%, and the temperature is raised to 40° C. for heat preservation for 15 min. Then, a material obtained after the enzymolysis is subjected to drying. The drying is conducted at a temperature of 75° C. until a product has a moisture content of less than 12%.

Comparative Example 2

On the basis of Example 1, in step 1), a cheese powder is only subjected to puffing and drying, but not enzymolysis, and other conditions are the same as those in Example 1. That is to say, a cheese powder is taken and subjected to puffing and drying. The puffing and the drying are conducted under the following conditions: the puffing is conducted by using a puffing machine at a feeding rate of 12 Hz, powder-water mixing is conducted in a first stage, clinker kneading is conducted in a second stage, puffing at a high temperature of 160-200° C. is conducted in a third stage, and then the drying is conducted by extrusion at a temperature of 75° C. until a product has a moisture content of less than 12% to obtain a modified cheese powder.

Comparative Example 3

On the basis of Example 1, a cheese powder is directly used as a raw material without modification. That is to say, step 1) is omitted, and other conditions are the same as those in Example 1.

Three groups of processed cheese in comparative examples and three groups of processed cheese in examples are prepared by using the above-mentioned preparation method, and the content of dimethyl disulfide in the processed cheese is measured separately.

TABLE 1

Comparison of the content of dimethyl disulfide

| Example | Dimethyl disulfide (mg/kg) |
|---|---|
| Example 1 | 3.64 |
| Example 2 | 3.16 |
| Example 3 | 3.28 |
| Comparative Example 1 | 1.63 |
| Comparative Example 2 | 1.48 |
| Comparative Example 3 | 0.09 |

It can be seen that in this application, the content of the dimethyl disulfide in the processed cheese may be significantly and moderately increased by modifying the cheese.

What is claimed is:

1. A method for moderately increasing the content of dimethyl disulfide in casein-containing processed cheese, comprising the following steps:
    1) providing a cheese powder, adding chymosin to the cheese power to initiate enzymolysis, and subjecting an enzymolysis product obtained after the enzymolysis to puffing and drying to obtain a modified cheese powder;
    2) providing 25-35 kg of the modified cheese powder, heating the modified cheese powder under stirring until the modified cheese powder is melt, adding 0.3-0.7 kg of sodium bicarbonate to adjust the pH to 6-7, and adding 0.03-0.07 kg of papain for enzymolysis;
    3) taking a an enzymolysis product of step 2) obtained after the enzymolysis in step 2), adding 15-25 kg of butter, 3-7 kg of a skimmed milk powder, 0.8-1.2 kg of fructo-oligosaccharide and 38-44 kg of water for mixing by stirring, and then adding 0.8-1.2 kg of an emulsifying salt, 0.003-0.007 kg of glutamine transaminase and 0.2-0.6 kg of salt for uniform heating and stirring to obtain a mixture; and
    4) subjecting the mixture obtained in step 3) to heat treatment, hot filling and cooling in sequence to obtain the processed cheese,
    wherein in step 1), the enzymolysis is conducted under the following conditions: the chymosin has an activity of 120,000-150,000 U/g and an addition amount of 1.5-3.5 ml per kg of the cheese powder, a moisture proportion is controlled to 10-15%, and a temperature is raised to 40° C. for heat preservation for 10-20 min, and
    wherein in step 1), the puffing and the drying are conducted under the following conditions: the puffing is conducted by using a puffing machine at a temperature of 160-200° C., and after the puffing, the drying is conducted by extrusion at a temperature of 75° C. until a product has a moisture content of less than 12%.

2. The method for moderately increasing the content of dimethyl disulfide in casein-containing processed cheese according to claim 1, wherein in step 2), the enzymolysis is conducted for 5-15 min.

3. The method for moderately increasing the content of dimethyl disulfide in casein-containing processed cheese according to claim 1, wherein in step 4), the heat treatment is conducted at a temperature of 90° C. for 15 min; the hot filling is conducted at 85° C.; and the cooling is conducted by rapid cooling to 30° C.

* * * * *